United States Patent [19]

Hermansson

[11] Patent Number: 4,648,970
[45] Date of Patent: Mar. 10, 1987

[54] ROTARY DISC FILTER WITH PERIPHERAL CAKE SUPPORTS

[75] Inventor: Hans Hermansson, Jarfalla, Sweden

[73] Assignee: Celleco AB, Stockholm, Sweden

[21] Appl. No.: 730,112

[22] Filed: May 3, 1985

[30] Foreign Application Priority Data

May 4, 1984 [SE] Sweden ................................. 8402398

[51] Int. Cl.⁴ ........................ B01D 33/26; B01D 33/36
[52] U.S. Cl. .................................... 210/327; 210/331;
210/332; 210/386; 210/486
[58] Field of Search ................ 210/327, 332, 331, 345,
210/386, 391, 392, 404, 406, 407, 433.1, 409, 334, 486

[56] References Cited

U.S. PATENT DOCUMENTS

| | | | |
|---|---|---|---|
| 1,804,934 | 5/1931 | Hoyt | 210/327 |
| 2,022,069 | 11/1935 | Whitmore | 210/327 |
| 2,731,157 | 1/1956 | Purmort | 210/327 |
| 2,772,000 | 11/1956 | Hunziker | 210/331 |
| 3,322,277 | 5/1967 | Pearson, Jr. et al. | 210/327 |
| 3,777,891 | 12/1973 | Stengelin | 210/331 |
| 4,056,473 | 11/1977 | Nilsson | 210/331 |
| 4,220,537 | 9/1980 | Takahashi et al. | 210/332 |
| 4,305,820 | 12/1981 | Stahl et al. | 210/327 |

FOREIGN PATENT DOCUMENTS 544932  6/1956  Italy ..................................... 210/331

Primary Examiner—Richard V. Fisher
Assistant Examiner—Linda S. Evans
Attorney, Agent, or Firm—Cyrus S. Hapgood

[57] ABSTRACT

A rotary filter, formed by a number of annular filter discs (1), mounted substantially parallel on a driving shaft, for the uptake and dewatering of fiber suspension from a container, fiber cakes (5) being formed, adhering to the outer sides of the filter discs (1), is provided with spraying nozzles (3), arranged in a removal zone for removal of said fiber cake (5). The invention consists of supporting elements (4) provided in the removal zone for supporting the fiber cake (5) in its upper loosened part and to prevent it from folding out from the filter disc (1) during the removal process.

6 Claims, 5 Drawing Figures

ROTARY DISC FILTER WITH PERIPHERAL CAKE SUPPORTS

This invention relates to rotary filters of the type disclosed in U.S. Pat. No. 4,056,473 dated Nov. 1, 1977, the disclosure of which is incorporated herein by reference. More particularly the invention relates to an improvement in such filters whereby removal of fiber cake from the filter discs is facilitated.

BACKGROUND OF THE INVENTION

Rotary filters of the above-mentioned type are commonly used for separating fibers from a fiber suspension. The filter comprises a group of annular filter discs each having a series of filter elements, the discs being mounted in substantially parallel, axially spaced relation on a horizontal drive shaft in a container for the fiber suspension. Each filter element is a hollow body having walls of screen cloth and communicating at its radially inner end with a discharge tube for filtrate. As the shaft and its discs rotate, the hollow filter elements pass successively through the suspension in the container, where filtrate enters the filter elements while more or less dewatered fiber cakes adhere to the outside of these elements. At least one nozzle for spraying a high pressure fluid is located at each side of each filter disc in a removal zone through which the filter elements pass after emerging from the fiber suspension. The sprays from these nozzles are intended to remove the filter cakes from the filter elements.

Rotary filters of the above-described type will normally have 5 to 20 filter discs each divided into 12 to 20 filter elements in the form of sectors which are truncated at their radially inner ends. In the operation of such filters when dewatering fiber pulp suspensions, a high capacity is desired, which means a high rotational speed. Also, it is desired to provide the dewatered fiber cake with a high dry solids content, which is achieved if the fiber cake is allowed to remain on the outside of each filter disc as long as possible from the moment when the disc carries the fiber cake from the suspension as the disc rotates.

If spray nozzles are provided in the conventional manner for spraying off the fiber cakes on both sides of each filter disc, some applications at a high rotational speed can give rise to problems, as the fiber cakes may adhere so firmly to the filter elements that parts of same are not removed but follow the filter disc in its rotation, so that the capacity of the filter is reduced. The reason is that the fiber cake in such cases is folded outwards at its upper part and is gradually rolled off the filter element, which takes a relatively long time.

SUMMARY OF THE INVENTION

The principal object of the present invention is to provide a rotary filter of the type described above which does not have the drawback just mentioned. According to the invention, such a filter is characterized in that a supporting element is provided at the outside of each filter disc in the vicinity of its periphery, which supporting element will support the fiber cake in the removal zone, at the loosened upper part of the cake, and will prevent same from folding out from the filter disc during the removal process.

The supporting element can be stationary in relationship to the rotating filter disc or be applied to the corresponding filter disc. The supporting element may have the form of a substantially plane plate, the plane of which, as seen from the periphery of the filter disc, is substantially parallel to the symmetry plane of the filter disc. In some cases, the plane may form a positive angle to the symmetry plane of the filter disc.

BRIEF DESCRIPTION OF THE DRAWING

The invention will now be described more in detail in the following, reference being made to the accompanying drawing in which.

DESCRIPTION OF PREFERRED EMBODIMENTS

Figure 1:
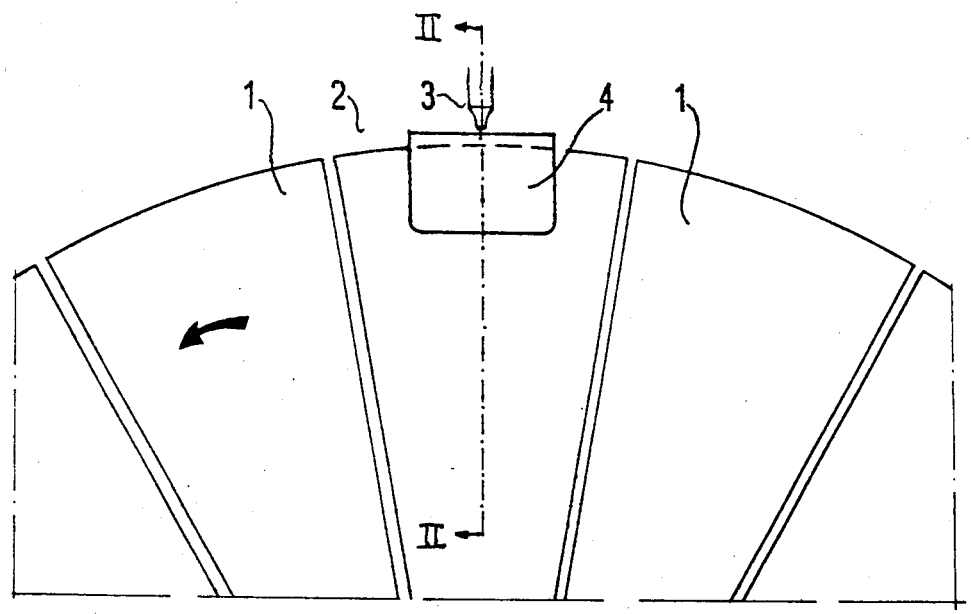
FIG. 1 is a side view of part of a filter disc with a device according to the invention.
Figures 2, 3:
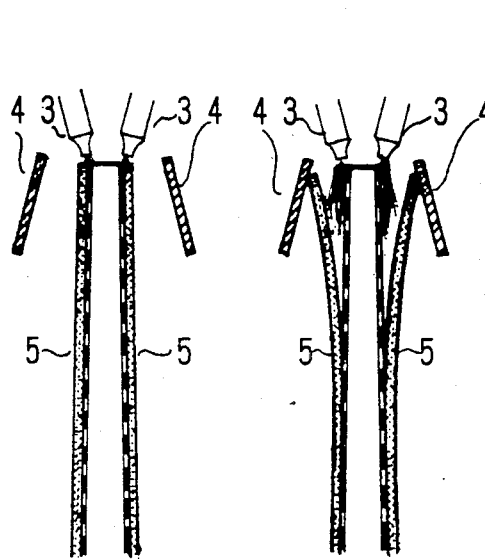
FIG. 2 is a sectional view along line II—II in FIG. 1 at the moment before the removal of the fiber cake starts.
FIG. 3 is a view similar to FIG. 2 but at the moment when the removal has started.
Figure 4:
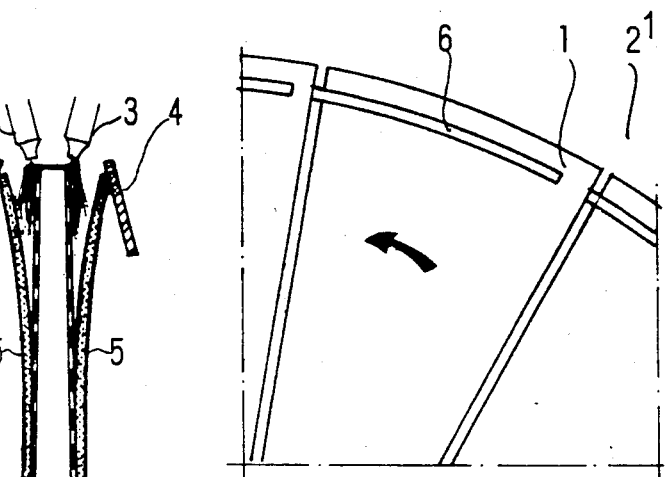
FIG. 4 is a side view of part of a filter disc with an alternative embodiment of a device according to the invention.

In FIG. 1, a series of hollow filter elements 1 form an annular filter disc 2. A nozzle 3 is provided to spray high pressure water downwards along each side of each filter element as it passes by the nozzle. A pair of supporting elements 4 is mounted stationary in relationship to the rotating filter disc 2, that is, immobile in relationship to the nozzles 3. In FIGS. 2 and 3, a fiber cake 5 is shown on opposite sides of the filter disc. In FIG. 4 there is shown an alternative embodiment of the supporting elements, which in this case is fastened as a loop 6 to the filter disc $2^1$ and thus follows the filter disc in its rotation.

When a filter element 1, during rotation of filter disc 2 reaches the nozzles 3 in the removal zone, the upper parts of the fiber cakes 5 near a peripheral joint are loosened under influence of the high pressure water jet from nozzles 3. The upper edge of each fiber cake tends to fold outwards, but this movement is prevented by the support element 4 or 6. The high pressure water jet from each nozzle 3 will build up a pressure behind the fiber cake, which will be transmitted towards the center or drive shaft of the filter so that the lower part of the fiber cake will also loosen. In this way, the entire fiber cake, with its lower part leading, can fall from the disc.

The supporting element can, of course, take many forms, such as a plate, a flat bar, a round bar, etc. However, the embodiment as a plate, preferably tilted as shown in FIG. 2 and 3 in relationship to the symmetry plane of the filter disc, is especially suitable.

Figure 5:
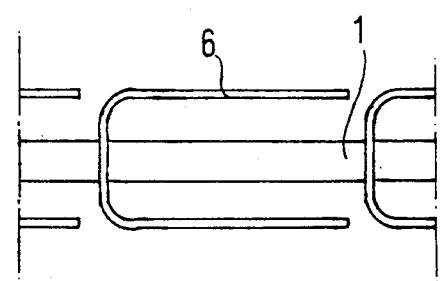
FIG. 5 is a view of the device in FIG. 4 as seen from above.

In the alternative embodiment of FIGS. 4 and 5, where each U-shaped element 6 follows a corresponding filter element 1 in its rotation with the disc, each leg of element 6 acts generally in the manner of each support element 4 in FIGS. 1–3.

I claim:

1. In a rotary filter intended primarily for separating fibers from a fiber suspension and comprising a plurality of annular filter discs with means for rotating the discs on a horizontal axis while immersed at their lower portions in a pool of said suspension, each filter disc having an annular series of hollow filter bodies with walls of screen cloth, each filter body having an outlet for filtrate entering said body through said screen cloth, each filter disc being operable, during rotation thereof, to carry each of its filter bodies through said pool while fiber cakes form on the outside of the body and filtrate enters the body, and a spray nozzle for high pressure fluid located at each side of each filter disc in a removal zone above said pool, each nozzle being positioned to direct a spray of fluid against a joint where the radially outer peripheral portion of a fiber cake adheres to an adjacent side of a filter body as it passes through the removal zone from said pool, the fluid spray acting to displace said fiber cake portion away from said adjacent side and then remove said fiber cake extending radially inward from the radially outer peripheral portion of the filter disc, the improvement which comprises a supporting element located at each side of each filter disc in the vicinity of its said peripheral portion, each supporting element being operable to support a displaced upper part of a fiber cake in said removal zone and prevent said upper part from folding away from the adjacent filter disc during removal of the cake from the disc, said supporting element being spaced sufficiently from the adjacent side of the filter disc to allow fiber cake to drop from the disc.

2. The improvement of claim 1, in which the supporting element is stationary in relationship to the rotating filter disc.

3. The improvement of claim 1, in which the supporting element is attached to the corresponding filter disc.

4. The improvement of any of claims 1-3, in which the supporting element is a substantially planar plate, the plane of which, as seen from the periphery of the filter disc, forms a positive angle to the symmetry plane of the filter disc.

5. The improvement of claim 1, in which each supporting element serves to support a said displaced upper part of a fiber cake on only one filter disc.

6. The improvement of claim 1, in which each nozzle directs its spray against only one said joint at a time.

* * * * *